D. HITCHCOCK.
Measuring-Funnel.
No. 206,946. Patented Aug. 13, 1878.
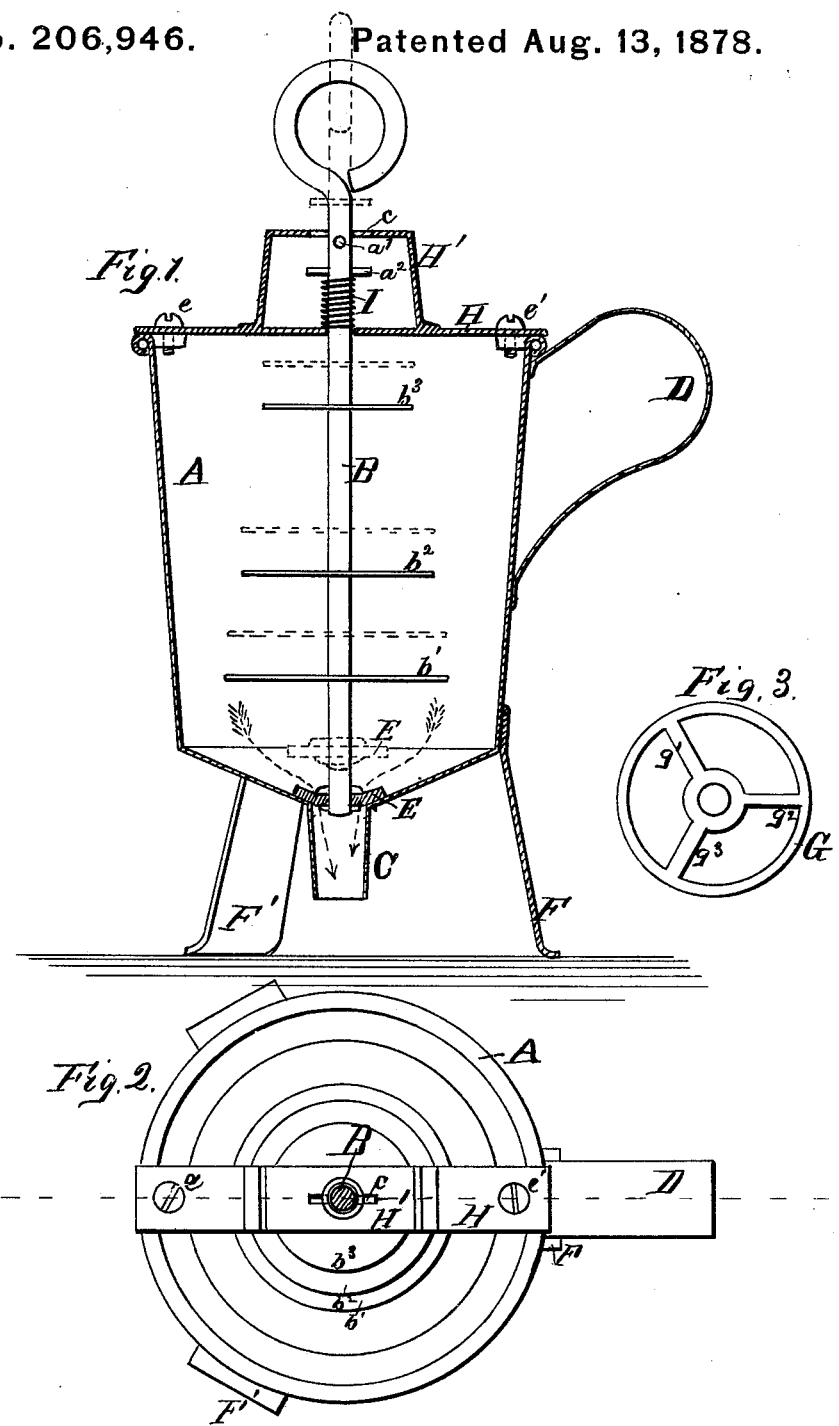

UNITED STATES PATENT OFFICE.

DWIGHT HITCHCOCK, OF SYRACUSE, NEW YORK, ASSIGNOR OF ONE-HALF HIS RIGHT TO GEORGE McBRIDE, JR., OF SAME PLACE.

IMPROVEMENT IN MEASURING-FUNNELS.

Specification forming part of Letters Patent No. 206,946, dated August 13, 1878; application filed July 26, 1878.

*To all whom it may concern:*

Be it known that I, DWIGHT HITCHCOCK, of the city of Syracuse, county of Onondaga and State of New York, have invented a certain new and useful Improvement in Combined Gaging Measure and Funnel; and I declare the following to be a full and complete description of my invention, so as to enable any person skilled in the art to which it appertains to make and use the same.

This invention relates to the class of measuring devices for liquids in which means are provided for gaging any quantity or fraction thereof and for discharging the contents into a jug or other small-necked vessel placed beneath the measure.

To this end my invention consists of an elongated cylindrical vessel, made of metal, mounted upon legs of sufficient length to permit the introduction under the measure of the desired receptacle. The lower end of the cylindrical vessel is drawn down to a funnel. The upper end has a bracing strip or shelf extending across the rim, and forming a guide and bearing for the valve stem or spindle, which extends down through the bracing-strip into the opening of the funnel. A common rubber valve attached to the stem opens or closes the funnel. The upper end of the valve-stem passes through the bracing-strip on the upper end of the vessel and through a guard-strip supported by lugs on the bracing-strip. A spiral spring interposed between the guard and bracing strips operates to open the valve of the funnel when the stem is turned, so as to disengage a small pin-bolt which passes through the stem and catches on the guard-strip when the valve is closed. On the valve-stem are secured thin disks of metal or rings, provided with hubs, through which the stem passes. These disks or rings are placed so as to indicate any desired quantity, as a pint, quart, &c., or fraction thereof.

It will be observed that the object of the invention is to provide a device to measure sirups and other liquids and to discharge the same into a jug without necessitating the employment of the separate utensils, and thereby facilitating the operation and effecting a saving of time.

For a more specific description of my invention reference is had to the accompanying drawing, forming a part of this specification, like letters indicating corresponding parts, in which—

Figure 1 is a vertical sectional view taken through the dotted line shown in Fig. 2. Fig. 2 is a plan view, showing the measuring-disks; and Fig. 3 shows a modification of the measuring-disks to be used in measuring molasses and sirups.

The letter A represents the body of the measure, which is made of metal, preferably of sheet-brass. On the upper end of the body the bracing-strip H is secured by means of screws fastening into lugs attached to the inner rim of the body. The valve-stem B passes through the guard-strip H′, which is secured onto the bracing-strip H, down through the vertical axis of the body, into the funnel $c$. A valve, E, made of rubber, is attached to the stem, and operates to open and close the funnel in the process of measuring and discharging liquids. A spiral-coil spring, I, is placed on the valve-stem, the stop-pin $a^2$ bearing thereon. A second pin, $a^1$, serves to hold the valve closed by passing through a slot, $c$, Fig. 2, and bearing against the guard-strip H′ on its under side. The measuring-disks or indicators are shown attached to the valve-stem at $b^1$, $b^2$, and $b^3$. These consist simply of a thin disk fitting onto the stem at distances apart, so as to indicate any given quantity, as a pint, quart, or fraction thereof. G, Fig. 3, shows a modification of the disk, consisting merely of a rim, hub, and three arms, $g^1$, $g^2$, and $g^3$. This form is designed for use in measures adapted to molasses or other heavy liquids. The dotted lines in Fig. 1 show the position of the valve and stem when the funnel is opened for the purpose of allowing the contents to run out.

It will be observed that to open the valve it is simply necessary to turn the stem so as to disengage the pin-bolt $a^1$. When the stem is thrown up by the spring I the bottom of the measure slopes to the funnel, so as to facilitate the discharge.

The device is mounted upon legs F F′ of sufficient height to allow the introduction of the receptacle underneath, and a handle, D, is secured upon the side of the body.

The whole device is simple and effective, and well adapted to accomplish the desired result.

Having thus fully described my invention, I claim as new and desire to secure by Letters Patent—

In combination, the valve-stem B, actuated and controlled by spring I, pins $a^1$ $a^2$, guides H H', the measuring-disks $b^1$, $b^2$, and $b^3$, and the cylindrical measuring-vessel A, having a funnel, $c$, as herein set forth and specified.

In testimony that I claim the foregoing I have hereunto set my hand this 24th day of July, A. D. 1878.

DWIGHT HITCHCOCK.

Witnesses:
 J. NEAL PERKINS,
 G. C. GIFFORD.